US008548853B2

(12) United States Patent
Zhang et al.

(10) Patent No.: US 8,548,853 B2
(45) Date of Patent: Oct. 1, 2013

(54) PEER-TO-PEER ADVERTISEMENT PLATFORM

(75) Inventors: Benyu Zhang, Beijing (CN); Fengping Zeng, Beijing (CN); Hua-Jun Zeng, Beijing (CN); Li Li, Issaquah, WA (US); Tarek Najm, Kirkland, WA (US); Wei-Ying Ma, Beijing (CN); Ying Li, Bellevue, WA (US); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 2056 days.

(21) Appl. No.: 11/147,247

(22) Filed: Jun. 8, 2005

(65) Prior Publication Data

US 2006/0282309 A1    Dec. 14, 2006

(51) Int. Cl.
*G06Q 30/00* (2012.01)
(52) U.S. Cl.
USPC ............... 705/14.49; 705/14.1; 705/14.46; 705/14.47
(58) Field of Classification Search
USPC ........... 705/14, 10, 14.1, 14.46, 14.49, 14.16, 705/14.31, 14.32, 14.72, 14.47; 375/E7.026, 375/E7.089; 709/217
See application file for complete search history.

(56) References Cited

U.S. PATENT DOCUMENTS

| | | | | |
|---|---|---|---|---|
| 5,907,831 | A * | 5/1999 | Lotvin et al. | 705/14 |
| 6,269,361 | B1 * | 7/2001 | Davis et al. | 707/3 |
| 6,324,573 | B1 * | 11/2001 | Rhoads | 709/217 |
| 6,850,252 | B1 * | 2/2005 | Hoffberg | 715/716 |
| 7,162,454 | B1 * | 1/2007 | Donner et al. | 705/64 |
| 7,266,704 | B2 * | 9/2007 | Levy | 713/193 |
| 7,321,928 | B2 * | 1/2008 | Feltin et al. | 709/223 |
| 7,398,226 | B2 * | 7/2008 | Haines et al. | 705/14.1 |
| 2002/0059379 | A1 * | 5/2002 | Harvey et al. | 709/205 |
| 2002/0138576 | A1 * | 9/2002 | Schleicher et al. | 709/205 |
| 2002/0169654 | A1 * | 11/2002 | Santos et al. | 705/10 |
| 2002/0198851 | A1 * | 12/2002 | Hashimoto et al. | 705/400 |
| 2003/0033192 | A1 * | 2/2003 | Zyman et al. | 705/10 |
| 2003/0177064 | A1 * | 9/2003 | Emura | 705/14 |
| 2003/0231769 | A1 * | 12/2003 | Bolle et al. | 380/210 |

(Continued)

OTHER PUBLICATIONS

Graller, Preston; How the Internet Works; Oct. 2006; Que Publishing; Eighth Edition; pp. 266-269 (Ch. 38 part 6 and 7).*

(Continued)

*Primary Examiner* — John G Weiss
*Assistant Examiner* — Adam Chornesky
(74) *Attorney, Agent, or Firm* — Shook Hardy & Bacon LLP (57) ABSTRACT

A peer-to-peer advertisement platform is provided to ubiquitously promote products or services supplied by advertisers across content-based applications executing on nodes in a peer-to-peer network. The peer-to-peer advertisement platform may include a registration component to register nodes in the peer-to-peer advertising platform, an advertisement submission component to receive advertisement data from the advertisers, and a distribution component to distribute the advertisement data to the nodes registered in the peer-to-peer advertisement platform. The peer-to-peer advertisement platform also includes a money sharing component to reward nodes based on a contribution level assigned to the node. Accordingly, the peer-to-peer advertisement platform stores the advertisement data locally at the plurality of nodes registered in the peer-to-peer advertising platform and shares a portion of the revenue generated from the advertisement data with the nodes registered in the peer-to-peer advertising platform.

12 Claims, 10 Drawing Sheets

(56) References Cited

U.S. PATENT DOCUMENTS

| | | | |
|---|---|---|---|
| 2004/0059644 A1* | 3/2004 | Blau | 705/26 |
| 2004/0254835 A1* | 12/2004 | Thomas et al. | 705/14 |
| 2005/0015511 A1* | 1/2005 | Izmailov et al. | 709/238 |
| 2005/0027821 A1* | 2/2005 | Alexander et al. | 709/218 |
| 2005/0086112 A1* | 4/2005 | Shkedi | 705/14 |
| 2005/0125308 A1* | 6/2005 | Puentes et al. | 705/26 |
| 2005/0177387 A1* | 8/2005 | Mojsa | 705/1 |
| 2005/0177502 A1* | 8/2005 | Thomas | 705/40 |
| 2005/0203851 A1* | 9/2005 | King et al. | 705/51 |
| 2006/0004600 A1* | 1/2006 | Summer et al. | 705/1 |
| 2006/0136294 A1* | 6/2006 | Linden et al. | 705/14 |
| 2006/0235756 A1* | 10/2006 | Pellegrino | 705/26 |
| 2006/0259356 A1* | 11/2006 | Zhang et al. | 705/14 |
| 2006/0277092 A1* | 12/2006 | Williams | 705/10 |
| 2006/0282309 A1* | 12/2006 | Zhang et al. | 705/14 |
| 2006/0293956 A1* | 12/2006 | Walker et al. | 705/14 |
| 2007/0061863 A1* | 3/2007 | Rajasekaran | 726/2 |
| 2007/0106551 A1* | 5/2007 | McGucken | 705/10 |
| 2007/0112574 A1* | 5/2007 | Greene | 705/1 |
| 2007/0270658 A1* | 11/2007 | Mitchell | 600/300 |
| 2008/0040211 A1* | 2/2008 | Walker et al. | 705/14 |

OTHER PUBLICATIONS http://web.archive.org BitTorrent home page May 29, 2005.*

* cited by examiner

Advertisement Submission

Type of Advertisement (Optional) ~710

○ Auction  ◉ Job  ○ Personal

720 ~ Description

730 ~ Willing to pay
$000.00

740 ~ Attachments

750 ~ URL (Optional)
http://

770 ~ Location

760 ~ Submit

PEER-TO-PEER ADVERTISEMENT PLATFORM

CROSS-REFERENCE TO RELATED APPLICATION

The present application is related to co-pending application, Ser. No. 11/127,130, entitled "Adpost: A Centralized Advertisement Platform," filed on May 12, 2005, which is incorporated herein by reference.

STATEMENT REGARDING FEDERALLY SPONSORED RESEARCH OR DEVELOPMENT

Not applicable.

BACKGROUND

Currently, Internet advertising tools, such as for example, Microsoft® adCenter, EBAY, Blogs, and Bulletin Board Systems (BBS), provide interfaces to receive products or services advertisements. For instance, Microsoft® adCenter allows advertisers having Internet mediums, websites, which promote the products or services advertisements, to pay for terms that are associated with the products or services advertisements. So, when a user enters the terms in an Internet search tool, e.g., Microsoft® MSN® search, the websites that promote the products or services advertisements are returned to the user in addition to normal search results.

EBAY, Blogs and BBS provide alternate Internet advertising tools to promote the products or services advertisements. However, each alternative lacks the ability to automatically determine whether the products or services advertisements are legitimate without endangering a group of consumers to fraudulent products or services advertisements. Moreover, advertisement publishers expend large amounts of resources storing and maintaining data corresponding to the products or services advertisements.

SUMMARY

A peer-to-peer advertisement platform promotes products or services provided by advertisers. Advertisers that fail to maintain Internet mediums describing the products or services provided by the advertisers may submit advertisements describing the products or services to the peer-to-peer advertisement platform. The peer-to-peer advertisement platform distributes the advertisements to nodes that are registered with the peer-to-peer advertisement platform and ubiquitously promotes the advertisements across content-based applications on nodes in a peer-to-peer network environment. Also, the peer-to-peer advertisement platform rewards registered nodes that aid in publishing the advertisements.

The peer-to-peer advertisement platform may include a registration component, an advertisement submission component and a distribution component. The registration component allows nodes to register with the peer-to-peer advertisement platform. The advertisement submission component enables advertisers to submit advertisements describing the products or services provided by the advertisers. The distribution component sends the advertisements to the nodes registered with the peer-to-peer advertisement platform.

The peer-to-peer advertisement platform may implement a method to reward nodes in the peer-to-peer network environment, and a method to distribute products or services advertisements to nodes in the peer-to-peer network environment. The method to reward nodes in the peer-to-peer network environment may include receiving a request for the advertisements, retrieving the advertisements from one or more nodes in the peer-to-peer network, tracking the requests for the advertisements to determine a utilization for each node and generating a reward for each node based on the utilization for each node.

The method to distribute the advertisements to nodes in the peer-to-peer network environment may include registering nodes in the peer-to-peer advertisement platform, receiving advertisement data from advertisers and distributing the advertisement data to the nodes registered in the peer-to-peer advertisement platform.

Accordingly, the peer-to-peer advertisement platform generates rewards based on each node's contribution to the delivery of the products or services advertisements. Furthermore, costs associated with maintaining, storing, and transmitting advertisement data may be reduced when implementing the peer-to-peer advertisement platform.

The Summary is provided to introduce a selection of concepts in a simplified form that are further described below in the Detailed Description. The Summary is not intended to identify key features or essential features of the claimed subject matter, nor is it intended to be used as an aid in determining the scope of the claimed subject matter.

DETAILED DESCRIPTION

Embodiments of the present invention provide a peer-to-peer advertisement platform to promote products or services provided by advertisers. The advertisers may submit data describing the products or services provided by the advertisers. The data may include information on different types of advertisements, such as, for example, personal, auction and job advertisements. The peer-to-peer advertisement platform distributes the data describing the advertisements to nodes in a peer-to-peer network environment. The nodes in the peer-to-peer network environment register with the peer-to-peer advertising platform. So, each node that aids in publishing or responding to an advertisement request may receive an award based on the amount or value of the contribution of each node. Nodes and computers are used interchangeably in the following description.

Figure 1:
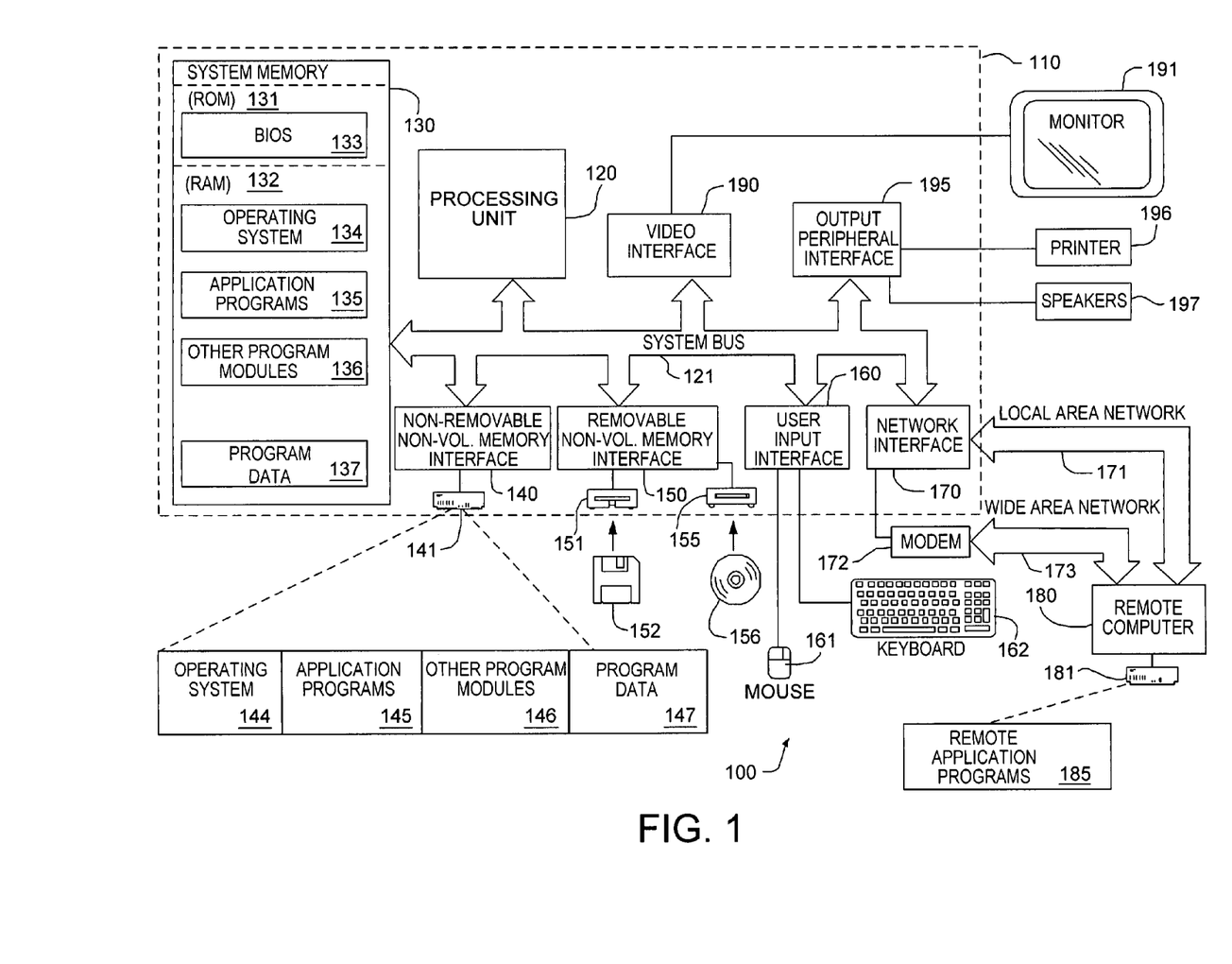
FIG. 1 illustrates a block diagram of a computing environment adapted to implement embodiments of the present invention.

FIG. 1 illustrates a block diagram that illustrates a computing environment 100 adapted to implement embodiments of the present invention.

The computing environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

The present invention is operational with numerous other general purpose or special purpose computing environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The present invention may be described in the general context of computer-executable instructions, such as program modules, being executed by a computer. Generally, program modules include routines, programs, objects, components, data structures, etc. that perform particular tasks or implement particular abstract data types. The present invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect Express (PCI Express) and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The wireless communication media may be networks such as for example, Bluetooth or 802.11 networks. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the processing unit 120 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks, such as wireless networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
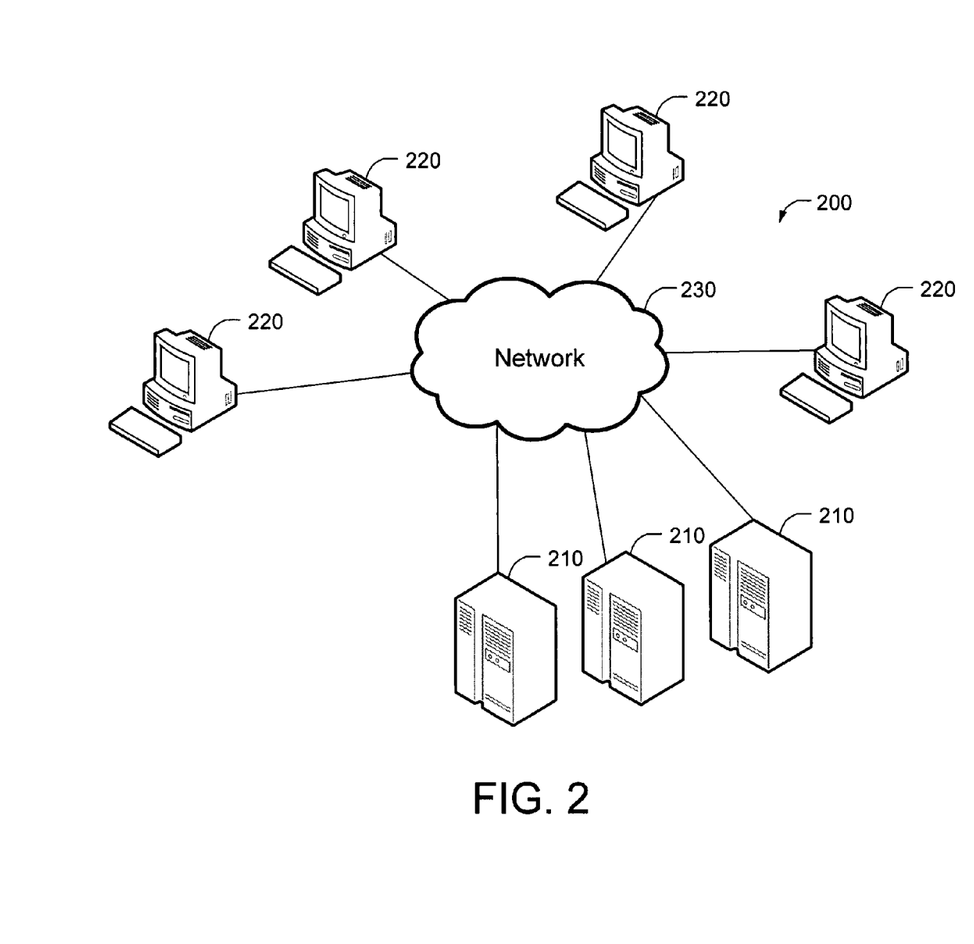
FIG. 2 illustrates a peer-to-peer network environment utilized by embodiments of the present invention.

FIG. 2 illustrates a peer-to-peer network environment 200 utilized by embodiments of the present invention.

The peer-to-peer network environment 200 may include client computers 220 and server computers 210 and network 230. The client computers 220 operate as both clients and severs and store or maintain products or services advertisement data. The network 230 may be a local or wide area network, or the Internet. The server computers 210 may operate to distribute the products or services advertisement data. Here, all operations of the peer-to-peer advertising platform are distributed among the client computers 220.

In an alternate embodiment of the present invention, the server computers 210 may centralize specified operations performed in the peer-to-peer network environment, such as, for example, accounting or billing operations. Therefore, the peer-to-peer network environment may implement a mix of a centralized and a peer-to-peer architecture, and an index utilized to respond to requests may be distributed across all the client computers 220 or the index may be centralized on the server computers 210.

Figure 3:
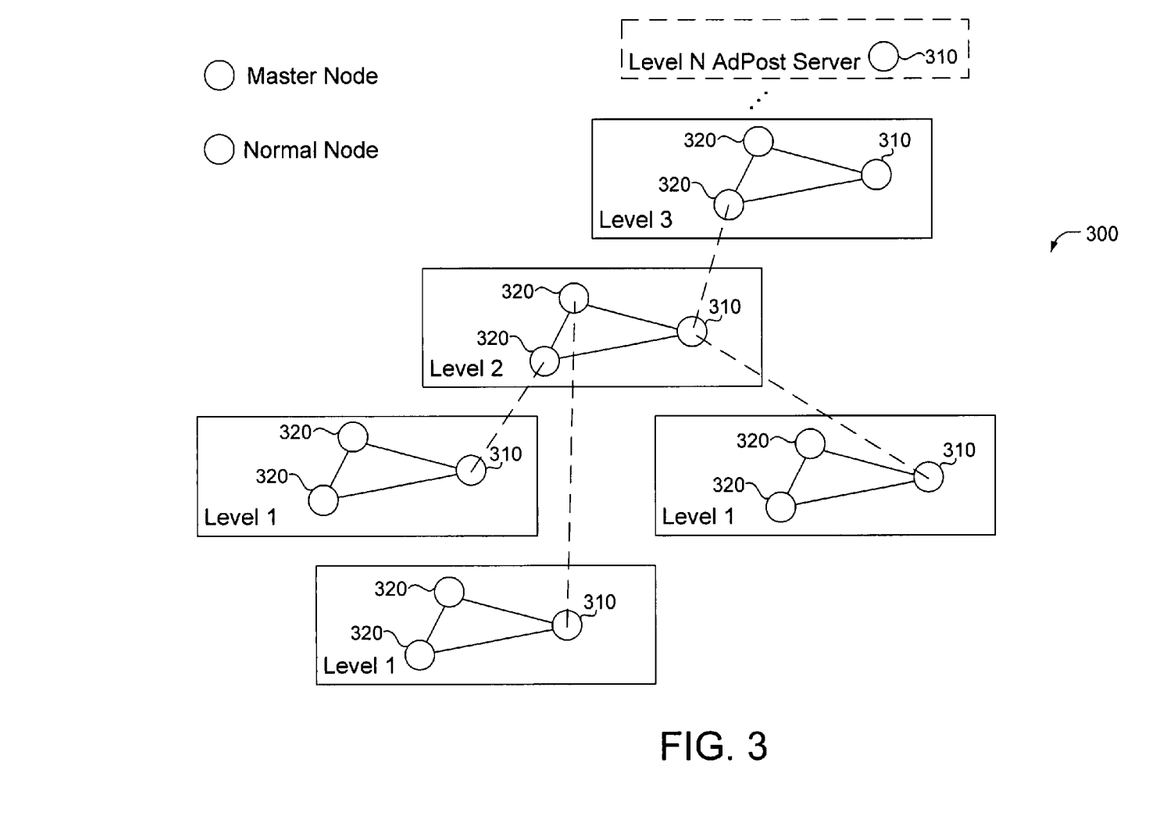
FIG. 3 illustrates an exemplary peer-to-peer architecture for the peer-to-peer network environment.

FIG. 3 illustrates an exemplary peer-to-peer architecture 300 for the peer-to-peer network environment 200.

The peer-to-peer architecture 300 implements a cascade architecture to manage the client computers 220 and server computers 210. The client computers 220 and server computers 210 may be master nodes 310 or normal nodes 320 in the peer-to-peer architecture 300. A mesh of normal nodes 320 elects a master node 310 to communicate with other meshes in the peer-to-peer architecture 300. The mesh of normal nodes 320 including the master node 310 represent a level in the peer-to-peer architecture 300. With reference to FIG. 3, each level contains n nodes, wherein n is three. The number of nodes n may be any integer value. Accordingly, every n normal nodes 320 elects a master node 310 and forms level one meshes. Then master nodes 310 in each level one mesh create level two meshes. The master nodes 310 of the level one mesh become normal nodes 320 that elect a master node 310 for each level two mesh created. The master nodes 310 of each level two mesh create level three meshes, and new levels are created until a root level having one or more master nodes 310. The master nodes 310 of the root level may be root nodes for the peer-to-peer architecture 300.

Here, each level is made up of several meshes, and each mesh is made up of several nodes. The master nodes 310 of each mesh continuously communicate and check the status of the normal nodes 320 of the mesh. The status is reported to a master node 310 in a mesh at higher level until the root node receives the status information. Accordingly, when a normal node 320 is down, a root node is informed and a new normal node 320 is selected to replace the normal node 320 that is down. When a master node 310 in a mesh is down, the normal nodes 320 in the mesh choose another master node 310 from the set of normal nodes 320 in the mesh, and a root node is informed of the change.

Furthermore, in an embodiment of the present invention, the root node may be a centralized server that selects normal nodes 320 to distribute advertisements based on an availability and location of the normal nodes 320. The nodes may automatically create the cascade architecture based on proximity. Thus, three normal nodes 320 having close proximity form a level one mesh. Thereafter, the normal nodes 320 may select a master node 310 based on processing speed, memory or performance of the master node 310. This architecture may be scaled to include a large number of nodes.

Figure 4:
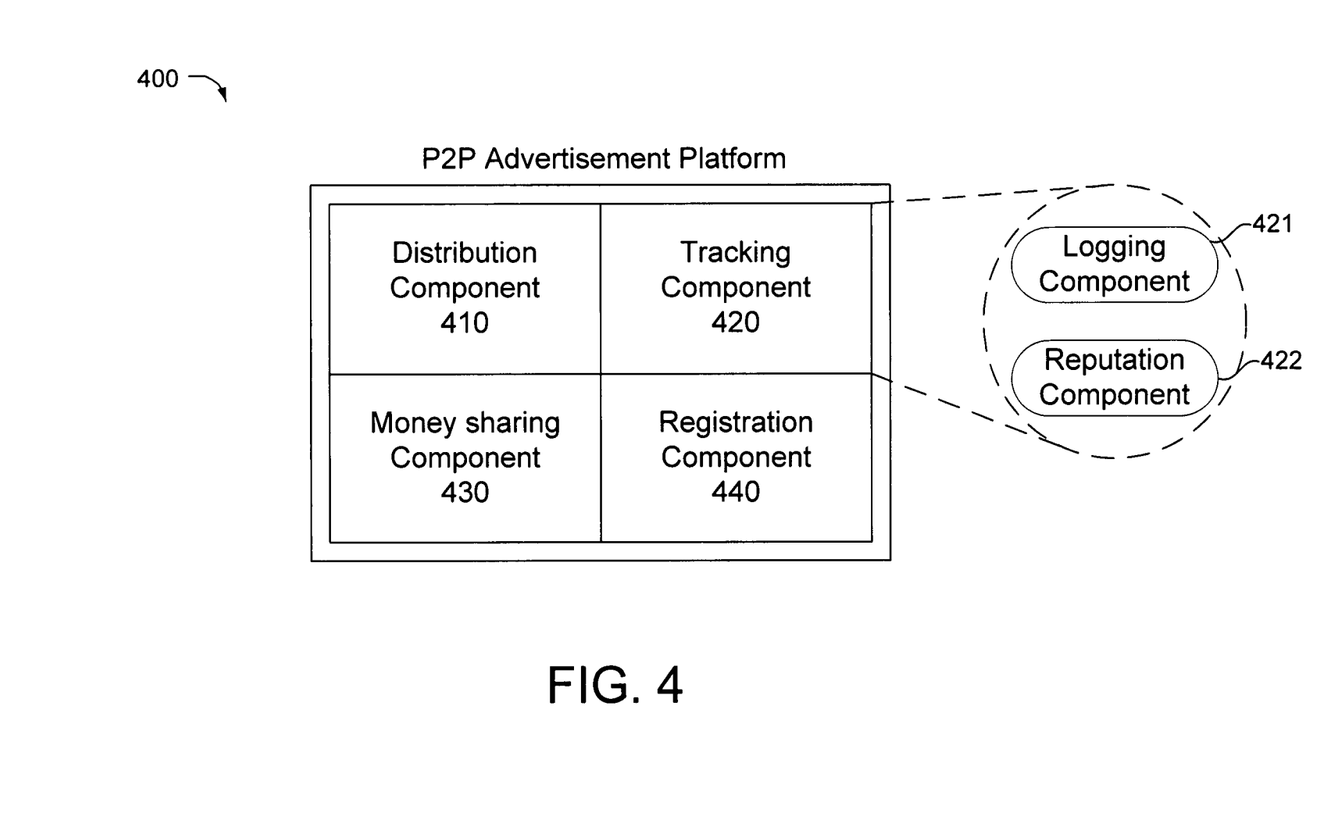
FIG. 4 illustrates a component architecture for a peer-to-peer advertisement platform.

FIG. 4 illustrates a component architecture 400 for the peer-to-peer advertisement platform utilized by the embodiments of the present invention.

The peer-to-peer advertisement platform may include a distribution component 410, a tracking component 420, a money sharing component 430 and a registration component 440. The registration component 440 allows a plurality of client computers 220 in the peer-to-peer network environment 200 to register with the peer-to-peer advertisement platform. The registration component 440 may also include an advertisement submission component that allows advertisers to submit data describing the products or services provided by the advertisers. The distribution component 410 enables the peer-to-peer advertisement platform to distribute the data describing the products or services provided by the advertisers to the plurality of client computers 220 registered in the peer-to-peer advertisement platform. The tracking component 420 logs communications between computers 210 or 220 in the peer-to-peer network environment 200. The tracking component includes a logging component 421, and a reputation component 422. The logging component 421 is similar to a log analysis component described in the co-pending application entitled "Adpost: A Centralized Advertisement Platform," which is herein incorporated by reference. The reputation component 422 utilizes information extracted by the logging component 421 to determine whether an advertiser is a legitimate advertiser. The reputation component 422 may automatically penalize advertisers or computers 220 that attempt to defraud the peer-to-peer advertising platform. The money sharing component 430 shares revenue with legitimate, registered, computers that aid in distributing advertisements in response to a user request. The money sharing component 430 may reward the registered client computers 210 based on a score assigned to the registered client computers 220. The reward may include gifts, coupons, software rebates or storage space. Although the component architecture 400 is depicted in an integrated manner the components 410-440 may be distributed among client computers 220 or stored centrally on server computers 210. Accordingly, in an embodiment of the present invention, the money sharing component 430 includes billing and accounting and components, which are centralized at server computers 210 while the other components 410-420 and 440 are distributed among the registered client computers 220.

Figure 5:
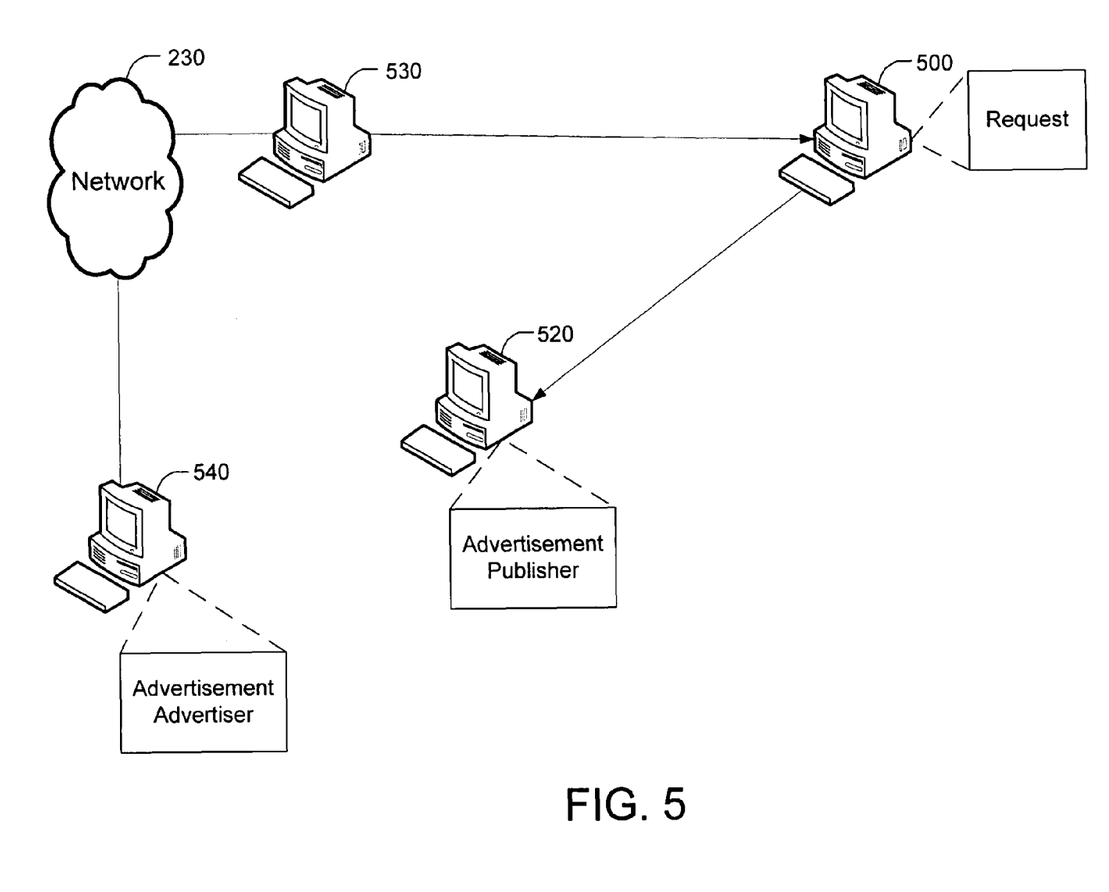
FIG. 5 illustrates the peer-to-peer network environment responding to a request for a products or services advertisement.

FIG. 5 illustrates the peer-to-peer network environment 200 responding to a request for a products or services advertisement.

Here, the peer-to-peer network environment 200 includes the network 230, an advertiser computer 540, a publisher computer 520, a user computer 500, and a neighbor computer 530. The computers 500-540 are client computer 220, and the publisher computer 520 and the neighbor computer 530 are registered with the peer-to-peer advertisement platform. So, the set of computers 500 includes registered and unregistered computers.

An advertiser utilizes the advertiser computer 540 to generate advertisement data describing services or products provided by the advertiser. The advertiser places the advertisement data on the peer-to-peer advertisement platform via the advertisement submission component. The peer-to-peer advertisement platform decides that the advertisement data generated by the advertiser computer 540 should be distributed to neighbor computer 530 and publisher computer 520 because the computers 520 and 530 are in a locale proximate to the products or services advertisement. For instance, the advertisement data generated by the advertiser computer 540 may be for the sale of a couch in Seattle, Wash. The peer-to-peer advertisement platform may determine that computers 520 and 530 are in Seattle and may distribute the advertisement data to computers 520 and 530, if they are registered with the peer-to-peer advertisement platform. Thus, when a user at the user computer 500, also located in Seattle, generates a request for a couch advertisement, the peer-to-peer advertisement platform may determine that the publisher computer 520 is the closest computer storing couch advertisement data. So, the advertisement publisher computer 520 responds to the request generated by the user computer 500. The user computer 500 does not have to be registered with the peer-to-peer advertisement platform to generate requests for products or services advertisements.

Figure 6:
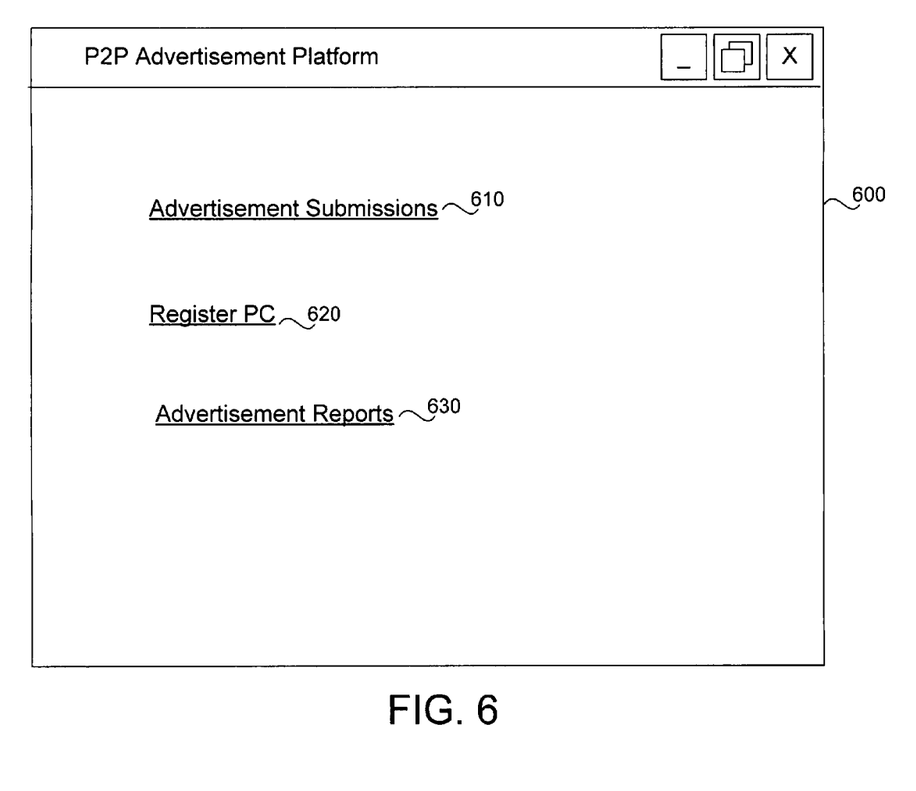
FIG. 6 illustrates a user interface for the peer-to-peer advertisement platform utilized by embodiments of the present invention.

FIG. 6 illustrates a user interface 600 for the peer-to-peer advertisement platform utilized by embodiments of the present invention.

The user interface 600 may include references to acts that owners or advertisers may perform when utilizing the peer-to-peer advertisement platform. The acts may include advertisement submissions, registration of a computer, and retrieving advertisement reports. The peer-to-peer advertisement platform may include an advertisement submission reference 610 that generates an advertisement submission user interface, where an advertiser may describe the products or services provided by the advertiser, a register PC reference 620 that generates a registration user interface, where an owner may register a computer in the peer-to-peer advertising platform, and an advertisement reports reference 630 that generates an advertisement report user interface, where an advertiser or owner to view reports on utilization, legitimacy, contribution or conversion.

Figure 7:
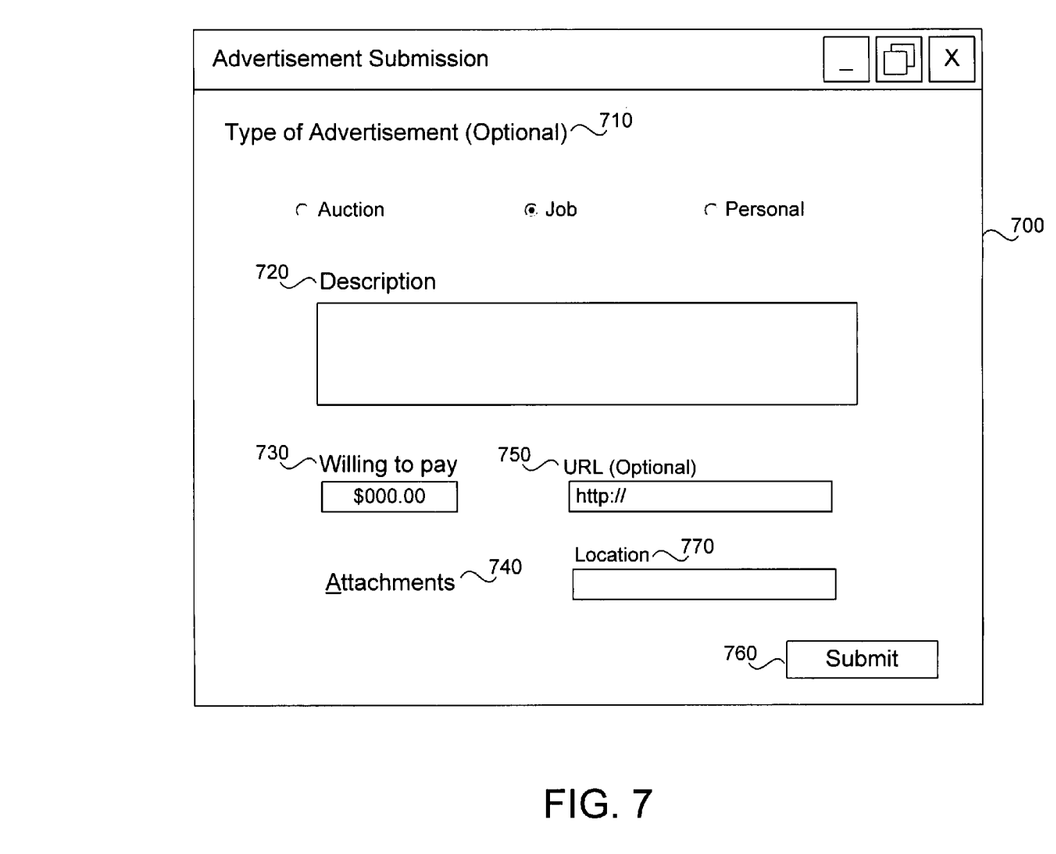
FIG. 7 illustrates an exemplary advertisement submission user interface, generated by a reference provided by the user interface of the peer-to-peer advertisement platform, where advertisers describe products or services provided by the advertisers.

FIG. 7 illustrates an exemplary advertisement submission user interface 700, generated by the reference 610 provided by the user interface 600 of the peer-to-peer advertisement platform, where advertisers describe advertisements for products or services provided by the advertisers.

The advertisement submission user interface 700 may include, but is not limited to, a type of advertisement radio button 710, a description field 720, a willing to pay field 730, an uniform resource locator (URL) field 750, an attachments reference 740, a location field 770 and a submit button 760.

The type of advertisement radio button 710, an optional element, may include auction, job, or personal advertisements selections. Here, the advertisers may specify whether the advertisements are job, auctions or personal advertisements. In an alternate embodiment of the present invention, if the user does not specify the type of advertisement, the peer-to-peer advertisement platform automatically categorizes data describing the products or services and received from the advertisers.

The description field 720 allows advertisers to enter the data describing the products or services provided by the advertisers. The data includes textual information, including cost or quantity data. In conjunction with the description field 720, the advertiser may also use the attachments reference 740 to include multimedia content, audio or video to the data describing the products or services. In an embodiment of the present invention, the peer-to-peer advertisement platform may bar the advertisers from submitting a submission that does not include data from either the description field 720 or attachment reference 740.

The willing to pay field 730 allows the advertisers to specify a monetary amount the advertisers are willing to pay to have the products or services promoted using the peer-to-peer advertisement platform. In an embodiment of the present invention, the advertisers may chose to pay per click or per transaction. When the advertisers pay per transaction, personal contact information may not be posted on the submission describing the products or services. The peer-to-peer advertisement platform may automatically detect if the submission includes personal contact information and bar the submission until the personal contact information is removed. The peer-to-peer advertisement platform will promote submissions having a high willing to pay value more than submissions having lower willing to pay value. Accordingly, the peer-to-peer advertisement platform may compare the advertisement submissions and rank advertisement based on the willing to pay value of each advertisement submission.

The URL field 750 is an optional field that allows the advertisers that have a homepage to specify the URL for the homepage.

The location field 770 allows the advertisers to specify a geographic region that the advertiser would like to target. For instance, an advertiser located in New York may wish to target advertisements to users in California. Accordingly, the location field enables the advertiser to specify the target location, such as, for example, California. In an alternate embodiment of the present invention, the advertisement may have global, national or local targets.

The submit button 760 allows the advertisers to submit the data describing the products or services to a database to store the data provided by the advertisers. Here, the data may be temporarily stored in a central node and distributed to a plurality of nodes registered in the peer-to-peer advertisement platform.

Figure 8:
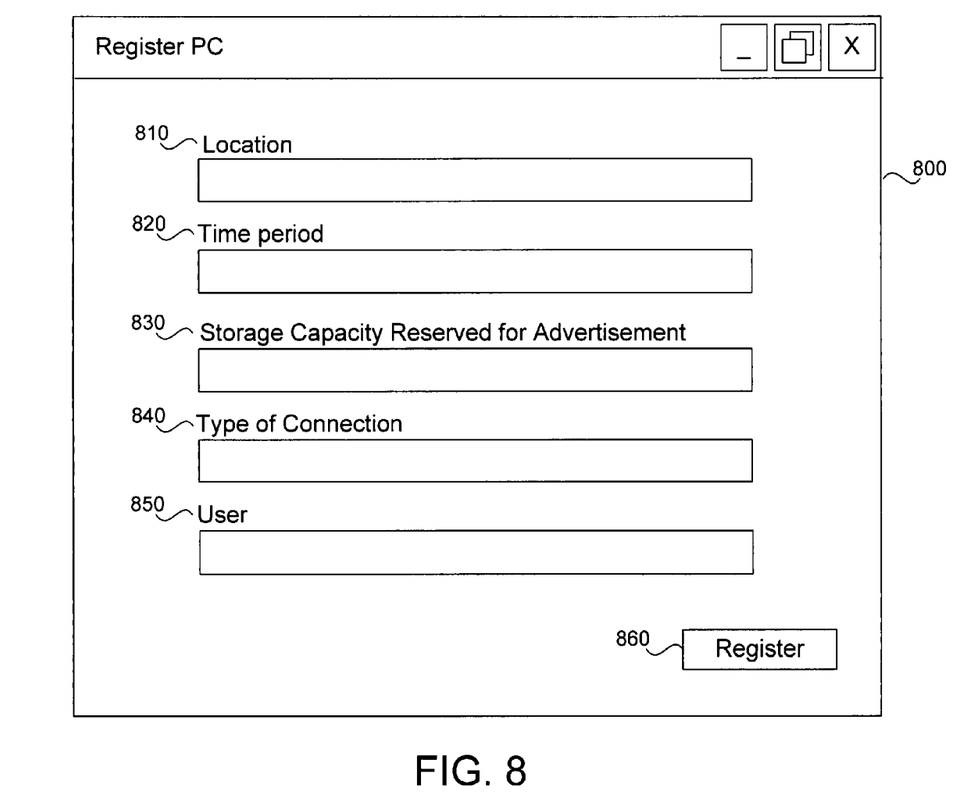
FIG. 8 illustrates an exemplary registration user interface, generated by a reference provided by the user interface of the peer-to-peer advertisement platform, where a node is registered with the peer-to-peer advertisement platform.

FIG. 8 illustrates a registration user interface 800, generated by the reference 620 provided by the user interface 600 of the peer-to-peer advertisement platform, where a node, computer, is registered with the peer-to-peer advertisement platform. So, a computer owner may utilize the registration user interface 800 to register one or more computers 220 with the peer-to-peer advertisement platform.

The registration user interface 800 may include a location field 810, a time period 820, a storage capacity field 830, a type of connection field 840, a user field 850 and a register button 860. The location field 810 allows the owner to specify the location of the computer 220. In an alternate embodiment of the present invention, the peer-to-peer advertisement platform may automatically detect the location of the computer, including when the computer is mobile. The time period field 820 allows an owner to specify the time when the computer 220 can be utilized by the peer-to-peer advertising platform. For instance, an owner may specify that the peer-to-peer advertisement platform may use the system between 5:00 PM and 10:00 PM. The storage capacity field 830 allows the owner specify a percentage of storage space on the computer 220 that can be reserved to store the products or services advertisements. The type of connection field 840 enables the owner to specify whether the computer is connected via dial-up or broadband, and an associated throughput of the computer 220, such as, for example, fifty-four megabytes per second. In an alternate embodiment of the present invention, the peer-to-peer advertisement platform may automatically detect the type of connection. The user field 850 allows the owner to uniquely identify the computer 220. Here a valid address, such as, for example, a hardware address may be utilized, or the peer-to-peer advertisement platform may generate a unique identifier to identify the computer 220. The register button 860 allows the owner to register the computer 220 with the peer-to-peer advertisement platform.

An advertisement reports user interface may also be utilized by the peer-to-peer advertisement platform. While not shown, the interface is similar to the advertisement reports user interface described in the co-pending application, entitled "Adpost: A Centralized Advertisement Platform," which is herein incorporated by reference. The reports may include a contribution report that shows the aid each registered computer 220 provided in the peer-to-peer network environment 200. The reports may also include an awards report to determine which computers 220 receive rewards from the peer-to-peer advertisement platform based on a utilization of the computer 220 by the peer-to-peer advertisement platform. Additionally, the report may include a conversion report to determine what types of advertisements generate the largest revenue, or which advertisements currently utilize large amounts the peer-to-peer advertisement platform's computer resources. Moreover, the reports user interface may include a legitimacy report to identify fraudulent owners or advertisers.

Figure 9:
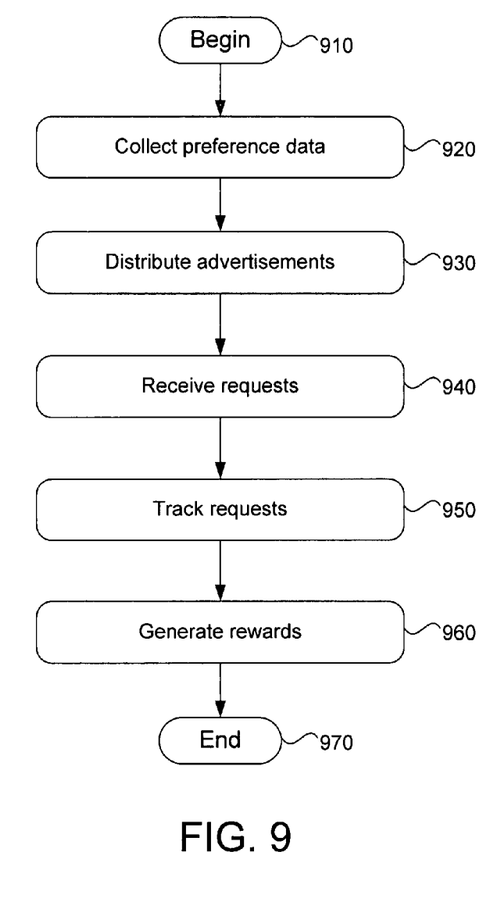
FIG. 9 illustrates a flow diagram, utilized by embodiments of the present invention, which implements a method to generate rewards for each node registered in the peer-to-peer advertisement platform.

FIG. 9 illustrates a flow diagram, utilized by embodiments of the present invention, which implements a method to generate rewards for each node or computer registered in the peer-to-peer advertisement platform.

The peer-to-peer advertisement platform 500 collects preference data, in step 920, from each node. The preference data may include information provided by the owner via the registration user interface 800. The peer-to-peer advertisement platform 500 distributes products or services advertisements to the nodes registered in the peer-to-peer advertisement platform in step 930. The peer-to-peer advertisement platform in step 940 receives products or services advertisement requests from a plurality of users. The requests are tracked in step 950 and an award is generated in step 960 based on the requests and the responses to the requests. The process ends in step 970.

For instance, when a user generates a query or search request for a product or service, advertisements related to the product or service are listed and returned to the user. When the user clicks one of the listed advertisements, the advertisement is retrieved from a node registered with the peer-to-peer advertisement platform and on which the advertisement is stored. A node impression of the node or nodes that serve the advertisement is created and stored in a log. The log may be stored locally at the node or centrally in a root node. Node impression data may include request and response information, such as, for example, time of request or response, node identifier, size of advertisement, etc, type of request. The node impression data is utilized to generate a score or contribution value for the nodes. Also, The node impression data is analyzed to determine which nodes are engaging in fraudulent activity.

The contribution of each node may be determined from each node's actual utilization by the peer-to-peer advertisement platform. The peer-to-peer advertisement platform may determine utilization from the node impression data, which may include actual storage capacity utilized by the served advertisement data, bandwidth utilized when serving the advertisement data and a time period of the actual utilization by the peer-to-peer advertisement platform. The contribution value may be a percentage that is the actual divided by the amount dedicated by the node to the peer-to-peer advertisement platform, or the total available at the node. For instance, a percentage for a storage space resource may be the actual storage space utilized by the advertising platform divided by the amount of storage space dedicated by the owner to the advertising platform. Thus, when the resource percentage for a node is above a contribution threshold, a reward is generated for the node. Accordingly, the node may be rewarded a portion of the revenue based on the contribution percentage. Moreover, when multiple nodes aid in promoting the advertisement, the reward may be dispersed among multiple nodes. In an alternate embodiment of the present invention, the contribution value assigned to a node may be scaled up by a demand factor when the utilization occurs during a high request time period, such as for example, during lunch.

In an embodiment of the present invention, a score may be utilized to represent the contribution of each node and the score may be stored locally on the node serving and storing the advertisement data or centrally on a server, root node. The score is incremented when the node storing the advertisement data serves the advertisement data in response to the user request, which may include click or transaction requests. When a high score is assigned to the node and the score is above a score or contribution threshold, a reward is generated and dispensed to the node. The score or contribution threshold may be predetermined by a system operator or may be calculated automatically. Rewards may include discounts on future transactions or sharing in the advertising revenue generated by the advertiser. The score may be signed by the peer-to-peer advertisement platform to ensure authenticity by using a digital signature scheme, such as, for example, X.509 certificates, and the signed score may be stored at the node storing the advertisement data or in a central location, such as for example the root node. Tracking the requests enables the peer-to-peer advertisement platform to increment the score of the node or nodes that the serve the advertisement. In an alternate embodiment of the present invention, users and advertisers may vote to give a score to the node based on a subjective valuation of the node's performance. Accordingly, the user or advertiser that generates the valuation of the nodes performance digitally signs the score.

Figure 10:
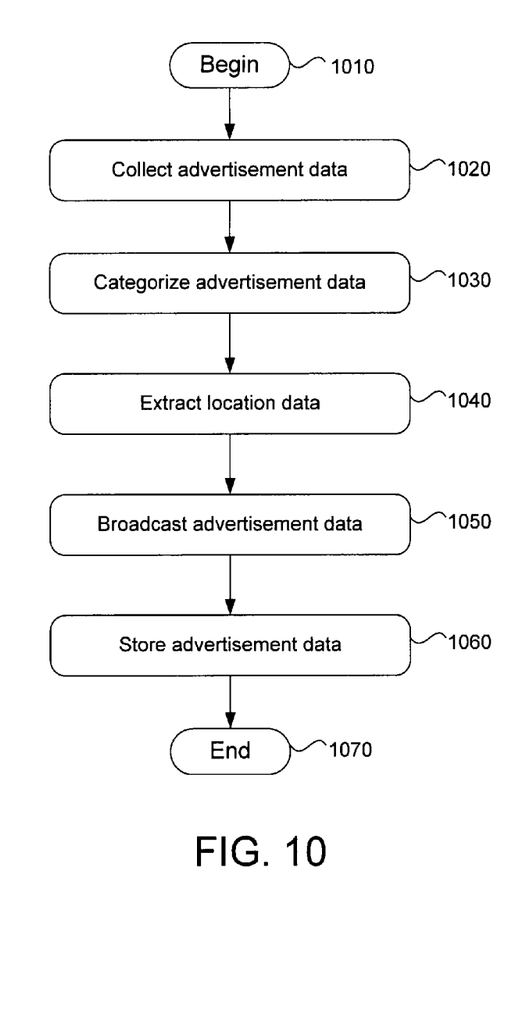
FIG. 10 illustrates a flow diagram, utilized by embodiments of the present invention, which implements a method to distribute products or services advertisements to each node registered in the peer-to-peer advertisement platform.

FIG. 10 illustrates a flow diagram, utilized by embodiments of the present invention, which implements a method to distribute advertisements to each node registered in the peer-to-peer advertisement platform.

The peer-to-peer advertisement platform collects advertisement data from a plurality of advertisers in step 1020. The advertisement data may be categorized according to the location or the type of advertisement data specified in the advertisement data in step 1030. The peer-to-peer advertisement platform extracts the location data or keywords related to the advertisement data in step 1040 and broadcasts the advertisement data to the plurality of registered nodes in step 1050 such that the location extracted from the advertisement data and the location of the plurality of registered nodes are proximate. The advertisement data is stored at the plurality of registered nodes in step 1060.

In an embodiment of the present invention, the advertisement data is temporarily cached on a central node and the central node signs the advertisement data to avoid fraudulent modification before the advertisement data is distributed to the plurality of registered nodes. Furthermore, multiple copies of the advertisement data may be stored on multiple nodes to alleviate traffic overload, or the advertisement data may be redistributed to prevent the load on each node from rising above a pre-specified load threshold. Also, to prevent a node from frequently receiving rewards, the advertisement data is redistributed to give other nodes an opportunity to receive rewards. Therefore, when a node surpasses a reward threshold, the advertisement data may be redistributed.

In sum, the peer-to-peer advertisement platform relieves advertisers from the burden of maintaining a homepage and enables the advertisers to promote different types of advertisements ubiquitously to a plurality of content-based applications. The peer-to-peer advertisement platform may be implemented in a completely distributed architecture where master nodes store a limited index that may be utilized to locate the advertisement data. In an alternate embodiment of the present invention, the peer-to-peer advertisement platform may store a complete index at a central, root node, and user requests are directed to the root node, which may redirect the user requests to nodes proximate to users generating the user requests. Moreover, the peer-to-peer advertisement platform generates rewards for nodes registered in the peer-to-peer advertisement platform and provides reports on advertisement conversion and legitimacy, and node contributions and rewards. The foregoing descriptions of the invention are illustrative, and modifications in configuration and implementation will occur to persons skilled in the art. For instance, while the present invention has generally been described with relation to FIGS. 1-10, those descriptions are exemplary. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method to reward nodes in a peer-to-peer network environment, the method comprising:
   signing, at a server computer, the advertisement data to avoid fraudulent modification before advertisements are distributed to the nodes in the peer-to-peer network;
   storing multiple copies of the advertisements at multiple nodes proximate to a location associated with the advertisement to alleviate traffic load;
   receiving click or transaction requests corresponding to an advertisement;
   retrieving the advertisement from a computing node in the peer-to-peer network, wherein the computing node is registered in a mesh that includes n proximate computers, n is a real number, and a master computing node is selected by several computing nodes in one or more meshes based on processing speed or storage capacity, and the one or more meshes are assigned levels that correspond to processing speeds or storage capacity;
   tracking the click or transaction requests to determine a utilization of the node; and
   generating, by the server computer, a reward based on the utilization of the node, wherein generating a reward based on the utilization of the node further comprises:
   (1) determining an amount of contribution of the node when retrieving the advertisement; and
   (2) rewarding the node when the contribution of the node is above a predetermined contribution level; and
   redistributing the advertisements stored on the nodes when one node surpasses a reward threshold, thereby providing opportunities for other nodes in the peer-to-peer network to receive rewards.

2. The method according to claim 1, wherein the node is registered and includes n computers, n is a real number.

3. The method according to claim 1, wherein determining the contribution of the node further comprises:
   determining a time period, and a percentage of node resources utilized when the advertisement is retrieved.

4. The method according to claim 1, wherein the reward is a percentage of a revenue generated by the advertisement retrieved from the node.

5. The method according to claim 1, wherein the reward is at least one of gifts, coupons, software and storage space.

6. A computer-implemented method to distribute advertisements in a peer-to-peer network environment, the method comprising:
   registering a plurality of computing nodes in a peer-to-peer advertisement platform;
   receiving advertisement data from a plurality of advertisers;
   categorizing, by a central server node, the advertisement data, wherein categorizing the received advertisement data comprises:
   extracting keywords and location information from the advertisement data, and
   storing the keyword and location information;
   distributing the advertisement data to the plurality of computing nodes registered in the peer-to-peer advertisement platform, wherein distributing the advertisement data further comprises:
   selecting a computing node from the plurality of computing nodes having a location corresponding to the location information extracted from the advertisement data, and sending the advertisement data to the selected computing node, and storing the advertisement data at the selected computing node, which includes a subset of the plurality of computing nodes;

logging advertisement data requests;

analyzing the advertisement data requests; and redistributing the advertisement data to optimize the load on the peer-to-peer network.

7. The method according to claim 6, wherein analyzing the advertisement requests further comprises:

determining a number of computing node impressions from the advertisement data requests; and calculating node utilization based on the number of computing node impressions.

8. The method according to claim 7, wherein redistributing the advertisement data further comprises:

moving the advertisement data from a node having high utilization to a computing node having low utilization.

9. A system for a peer-to-peer advertisement platform, the system comprising:

a server computer executing the following:

a registration component to register a plurality of computing nodes in the peer-to-peer advertisement platform;

an advertisement submission component to receive advertisement data from a plurality of advertisers;

a distribution component to distribute the received advertisement data to the plurality of computing nodes registered in the peer-to-peer advertisement platform;

a money sharing component to generate rewards based on a utilization of advertisement data stored by at least one computing node of the plurality of computing nodes, wherein the money sharing component determines utilization by dividing actual usage by the advertisement data and amounts dedicated by the at least one computing node of the plurality of computing nodes;

a tracking component to log advertisement data requests; and a reputation component to authenticate the advertisement data and reports node engaging in fraudulent activity.

10. The system of claim 9, wherein the advertisement data includes audio and video content.

11. The system of claim 9, wherein the peer-peer network is a cascade cluster of computing nodes.

12. The system according to claim 9, wherein billing and accounting components are executed on a central computing node.

* * * * *